US009217074B2

(12) United States Patent
Glos et al.

(10) Patent No.: US 9,217,074 B2
(45) Date of Patent: Dec. 22, 2015

(54) MOLDINGS BASED ON REACTION PRODUCTS OF POLYOLS AND ISOCYANATES

(71) Applicants: Martin Glos, Borken (DE); Jochen Kleinen, Essen (DE); Joachim Venzmer, Essen (DE); Peter Gansen, Seeburg (DE); Matthias Ausmeier, Osterode am Harz (DE); Frank Stefan Klingebiel, Duderstadt (DE)

(72) Inventors: Martin Glos, Borken (DE); Jochen Kleinen, Essen (DE); Joachim Venzmer, Essen (DE); Peter Gansen, Seeburg (DE); Matthias Ausmeier, Osterode am Harz (DE); Frank Stefan Klingebiel, Duderstadt (DE)

(73) Assignees: EVONIK INDUSTRIES AG, Essen (DE); TECHNOGEL GMBH, Duderstadt (DE)

(*) Notice: Subject to any disclaimer, the term of this patent is extended or adjusted under 35 U.S.C. 154(b) by 11 days.

(21) Appl. No.: 14/046,163

(22) Filed: Oct. 4, 2013

(65) Prior Publication Data

US 2014/0100314 A1    Apr. 10, 2014

(30) Foreign Application Priority Data

Oct. 4, 2012   (EP) .................................... 12187180

(51) Int. Cl.
| | |
|---|---|
| *C08K 5/5415* | (2006.01) |
| *C08K 13/02* | (2006.01) |
| *C08G 77/46* | (2006.01) |
| *C08G 18/48* | (2006.01) |
| *C08G 18/61* | (2006.01) |
| *C08G 18/73* | (2006.01) |
| *C08G 18/10* | (2006.01) |
| *C08G 18/22* | (2006.01) |
| *C09K 3/10* | (2006.01) |
| *C08L 75/08* | (2006.01) |
| *C08K 3/22* | (2006.01) |
| *C08K 3/36* | (2006.01) |
| *C08L 71/02* | (2006.01) |
| *C08L 83/12* | (2006.01) |

(52) U.S. Cl.
CPC .............. *C08K 13/02* (2013.01); *C08G 18/10* (2013.01); *C08G 18/227* (2013.01); *C08G 18/4829* (2013.01); *C08G 18/4833* (2013.01); *C08G 18/61* (2013.01); *C08G 18/73* (2013.01); *C08G 77/46* (2013.01); *C08L 75/08* (2013.01); *C09K 3/1021* (2013.01); *C08G 2220/00* (2013.01); *C08K 3/22* (2013.01); *C08K 3/36* (2013.01); *C08L 71/02* (2013.01); *C08L 83/12* (2013.01); *C08L 2205/03* (2013.01)

(58) Field of Classification Search
CPC ....... C08G 77/46; C08G 18/14; C08G 18/227
USPC ...................................................... 524/265
See application file for complete search history.

(56) References Cited

U.S. PATENT DOCUMENTS

| | | | |
|---|---|---|---|
| 3,620,984 A | 11/1971 | Dahm et al. | |
| 4,456,642 A | 6/1984 | Burgdorfer et al. | |
| 5,362,834 A | 11/1994 | Schaepel et al. | |
| 5,952,072 A | 9/1999 | Colby et al. | |
| 6,552,091 B1 | 4/2003 | Boinowitz et al. | |
| 6,809,143 B2 | 10/2004 | Nowak et al. | |
| 7,157,541 B2 | 1/2007 | Knott et al. | |
| 7,196,153 B2 | 3/2007 | Burkhart et al. | |
| 7,612,158 B2 | 11/2009 | Burkhart et al. | |
| 7,906,664 B2 | 3/2011 | Allef et al. | |
| 7,910,119 B2 | 3/2011 | Allef et al. | |
| 8,211,972 B2 | 7/2012 | Meyer et al. | |
| 8,227,399 B2 | 7/2012 | Wenk et al. | |
| 2004/0258649 A1 | 12/2004 | Peggau et al. | |
| 2007/0092470 A1 | 4/2007 | Allef et al. | |
| 2007/0178144 A1 | 8/2007 | Hameyer et al. | |
| 2008/0004357 A1 | 1/2008 | Meyer et al. | |
| 2008/0108709 A1 | 5/2008 | Meyer et al. | |
| 2008/0214769 A1* | 9/2008 | Pohl et al. ........................ | 528/44 |
| 2010/0184733 A1 | 7/2010 | Korevaar et al. | |
| 2010/0266651 A1 | 10/2010 | Czech et al. | |
| 2010/0294982 A1 | 11/2010 | Schiller et al. | |
| 2011/0257280 A1* | 10/2011 | Glos et al. ........................ | 521/54 |
| 2011/0300082 A1 | 12/2011 | Wenk et al. | |
| 2012/0308503 A1 | 12/2012 | Wenk et al. | |
| 2012/0309667 A1 | 12/2012 | Wenk et al. | |
| 2013/0071340 A1 | 3/2013 | Wenk et al. | |

FOREIGN PATENT DOCUMENTS

| | | |
|---|---|---|
| DE | 1229290 | 4/1965 |
| DE | 19940797 A1 | 3/2001 |
| EP | 0057838 A1 | 8/1982 |
| EP | 0 129 858 A2 | 1/1985 |
| EP | 0511570 A1 | 11/1992 |
| EP | 1125975 A1 | 8/2001 |
| EP | 1439200 A1 | 7/2004 |
| EP | 0 982 338 B1 | 4/2005 |
| EP | 1520870 A1 | 4/2005 |
| EP | 1 529 789 A1 | 5/2005 |
| GB | 1090589 | 11/1967 |
| JP | 62-146954 | 6/1987 |

(Continued)

OTHER PUBLICATIONS

Saint Michael, F., et al., "Rheometric properties of micron-sized CaCO3 suspensions stabilised by a physical polyol/silica gel for polyurethane foams", Rheol Acta, Published online: Apr. 19, 2005, 44, pp. 644-653.

(Continued)

*Primary Examiner* — Kuo-Liang Peng
(74) *Attorney, Agent, or Firm* — Scully, Scott, Murphy & Presser, P.C.

(57) ABSTRACT

Molding compositions are provided that include a) one or more polyisocyanates, b) one or more polyols, c) one or more catalysts catalyzing the reaction between polyisocyanate and polyol, d) one or more pyrogenically produced oxides of a metal or of a metalloid, and e) at least one or more siloxanes.

10 Claims, No Drawings

(56) References Cited

FOREIGN PATENT DOCUMENTS

WO      2008 071497    *   6/2008
WO    WO2009092505 A1    7/2009

OTHER PUBLICATIONS

"AEROSOL fur losemittelfreie Expodharzel", Schriftenreihe Pigmente, No. 27, pp. 1-40, Degussa, Frankfurt (Aug. 1993).

Kunststoff-Handbuch [Plastics handbook] vol. VII, edited by Vieweg and Höchtlen, Carl-Hanser-Verlag Munich, 1966, pp. 96-102.

Ullmanns Enzyklopädie der technischen Chemie [Ullmann's Encyclopaedia of industrial chemistry], 1982, 4th Edition, vol. 21, pp. 464 and 465.

European Search Report issued in related European Application No. EP 12187180.0.

* cited by examiner

MOLDINGS BASED ON REACTION PRODUCTS OF POLYOLS AND ISOCYANATES

FIELD OF THE INVENTION

The present invention relates to molding compositions comprising the following components: a) one or more polyisocyanates, b) one or more polyols, c) one or more catalysts catalyzing the reaction between polyisocyanate and polyol, d) one or more pyrogenically produced oxides of a metal or of a metalloid, and e) at least one or more siloxanes, moldings obtainable with use of the molding compositions, and also a process for the production of the moldings.

BACKGROUND

WO 2009/092505 describes the production of insulating polyurethane foams, where porous solids, in particular zeolites, are used as nucleating agents.

EP 0057838 A1 describes the production of gel cushions, where the gel is composed of a high-molecular-weight matrix made of covalently crosslinked polyurethane, and, securely bound within the matrix via secondary valence forces, liquid dispersion medium made of one or more polyhydroxy compounds. The gel cushions are produced by casting the reaction mixture into prepared casings, where the gel reaction is completed.

EP 0511570 A1 describes gels based on reaction products of polyols and polyisocyanates, where polyols used comprise mixtures of polyols with different hydroxy numbers. Again, the gels are produced by casting the reaction mixtures into prepared casings, where the gel reaction is concluded.

EP 1125975 A1 describes the production of gels based on reaction products of polyisocyanates and polyols which comprise at least one pyrogenically produced oxide of a metal or metalloid in order to improve mechanical tensile strength and elongation at break. Here again, the shaping of the gel is achieved by casting the reaction mixture into a casing or mold.

In Rheol. Acta (2005) 44, 644-653 (DOI 10.2007/s00397-005-0446-3), Saint Michel et al. describe the changes in the rheological properties of mixtures of a silica-gelled polymer matrix comprising polyol, catalyst and surfactant caused by addition of $CaCO_3$ particles with a particle size in the micrometer range. The surfactant used comprises a polydimethylsiloxane/polyoxyethylene copolymer. According to the first complete paragraph in the right-hand column on page 650 of that document, the surfactant was found to have no effect on rheological properties.

A disadvantage of the gels described and/or of the process for production thereof is restriction to moldings which are obtainable via casting and optionally subsequent trimming.

SUMMARY OF THE INVENTION

The present invention provides a process for production of gels which provides, in a simple manner, access to a wider variety of shapes.

Surprisingly, it has been found that addition of organomodified siloxanes to the reaction mixture can render this thixotropic or more thixotropic, and thus permits molding of the reaction mixtures in a simple manner via conventional shaping processes such as extrusion, to give dimensionally stable linear products.

The present invention therefore provides molding compositions comprising the following components: a) one or more polyisocyanates, b) one or more polyols, c) one or more catalysts catalyzing the reaction between polyisocyanate and polyol d) one or more pyrogenically produced oxides of a metal or of a metalloid, and e) at least one or more siloxanes of formula (I). The present invention further provides moldings obtainable with use of the aforementioned molding compositions, and also to a process for the production of the moldings.

An advantage of the molding compositions of the present invention is that the disclosed molding compositions can be molded in a simple manner by using conventional shaping processes to give dimensionally stable moldings. The dimensionally stable moldings then react to give the desired final products.

The disclosed molding compositions of the present invention can have the advantage of a higher yield point than molding compositions of this type which comprise no compound of formula (I).

If the molding compositions comprise no blowing agents and are intended for processing to give gel-type moldings, the disclosed molding compositions have the further advantage that the moldings obtained after the gel reaction correspond to, or at least in essence correspond to, the dimensionally stable moldings previously obtained from the shaping process, i.e., that the change in all of the dimensions is smaller than 20%. In some embodiments, it is thus possible to avoid a downstream mechanical operation, in particular subsequent shaping.

An advantage of the disclosed process of the present invention is that by virtue of controlled addition of the siloxane it is possible to achieve controlled adjustment of the rheological properties of the system. It is thus possible when the product discharged is linear to modify the concentration of the siloxane of formula (I) appropriately in such a way as to permit production of a smooth transition between the start and end of a (circular) sealing bead.

Another advantage of the disclosed process of the present invention is that it is readily possible to achieve controlled adjustment of thixotropy/viscosity (switch-on and switch-off or controlled adjustment of thixotropy or viscosity). This can be achieved via simple addition of a liquid component (siloxane of formula (I)), and this also results in simple processing. The conventional methods are very inconvenient, and conclusive, i.e., produce a fixed viscosity.

DETAILED DESCRIPTION

The subject matter of the invention is described by way of example below, without any intention that the invention be restricted to these examples of embodiments. Insofar as ranges, general formulae or classes of compound are stated below, these are intended to encompass not only the appropriate ranges or groups of compounds explicitly mentioned but also all of the sub-ranges and sub-groups of compounds which can be obtained via extraction of individual values (ranges) or compounds. Where documents are cited for the purposes of the present description, the entire content of these is intended to become part of the disclosure of the present invention, in particular in relation to the factual context in connection with which the document has been cited. Percentage data are in percent by weight unless otherwise stated. Where average values are stated below, they are weight averages unless otherwise stated. Where parameters are stated below that have been determined by measurement, the measurements were made at a temperature of 25° C. and at a pressure of 101 325 Pa unless otherwise stated.

For the purposes of the present invention, polyurethane (PU) is a product obtainable via reaction of isocyanates and polyols or compounds having groups reactive towards isocyanate. It is also possible that other functional groups are formed alongside the polyurethane that give the material its name, examples being allophanates, biurets, ureas, and isocyanurates. For the purposes of the present invention, PU therefore means not only polyurethane but also polyisocyanurate.

The molding compositions of the present invention comprise the following components:
a) one or more polyisocyanates,
b) one or more polyols,
c) one or more catalysts catalyzing the reaction between polyisocyanate and polyol,
d) one or more pyrogenically produced oxides of a metal or of a metalloid, and
e) at least one or more siloxanes of formula (I)

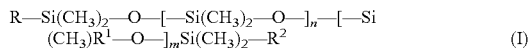
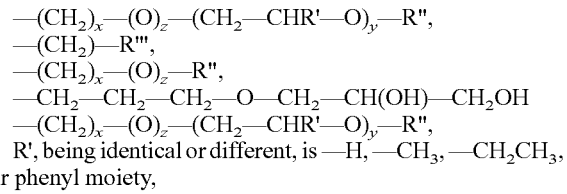

(I)

where
R, $R^1$ and $R^2$ are identical or different,
R and/or $R^2$ are methyl or $R^1$,
$R^1$, being identical or different, is selected from the group of
—$(CH_2)_x$—$(O)_z$—$(CH_2$—$CHR'$—$O)_y$—$R''$,
—$(CH_2)$—$R'''$,
—$(CH_2)_x$—$(O)_z$—$R''$,
—$CH_2$—$CH_2$—$CH_2$—$O$—$CH_2$—$CH(OH)$—$CH_2OH$
—$(CH_2)_x$—$(O)_z$—$(CH_2$—$CHR'$—$O)_y$—$R''$,
R', being identical or different, is —H, —$CH_3$, —$CH_2CH_3$, or phenyl moiety,
R", being identical or different, is —H, —(CO)—R''', —(CO)—NH—R''' or -alkyl, preferably $C_1$ to $C_{40}$-alkyl, with preference $C_1$- or $C_6$ to $C_{30}$-alkyl,
R''', being identical or different, is $C_1$ to $C_{40}$-alkyl, -aryl or -alkylaryl; optionally also substituted with halogens,
n+m+2=from 10 to 150, preferably from 12 to 85, with particular preference from 15 to 47,
m=from 0 to 20, preferably from 1 to 4,
x=from 2 to 15, preferably from 3 to 10,
y=from 1 to 40, preferably from 2 to 19,
z=0 or 1,
where the units ($CH_2$—$CHR'$—O) can be identical or different,
with the proviso that for m=0 at least one moiety R or $R^2$ is identical with $R^1$,
and that if z=0x and y=0 and R" has at least 2 carbon atoms, with the proviso that the molding composition comprises less than 2% by weight, preferably less than 0.2% by weight, based on the entire constitution of the molding composition, of physical blowing agent.

It is preferable that the molding compositions comprise, as component e), siloxane compounds of formula (I) in which the moieties $R^1$ are —$(CH_2)_x$—$(O)_z$—$(CH_2$—$CHR'$—$O)_y$—R" moieties, where R', R", x, y, and z are as defined above. It is particularly preferable that the numeric-average molar proportion of alkylene oxide units where R'=H, based on all of the alkylene oxide units in the moieties $R^1$, is at least 80%, preferably at least 90%, and/or that at least 80% of the moieties R" are hydrogen.

In some particularly preferred embodiments, the molding compositions of the present invention may comprise, as component e), siloxane compounds of formula (I) in which the quotient Q=number of Si atoms/number of moieties $R^1$ (in each case in numeric average per molecule) is from more than 5 to less than or equal to 16, preferably from more than 8 to less than or equal to 12.

The proportion of component d) in the molding composition of the present invention is preferably from 1 to 30 parts by weight, preferably from 5 to 20 parts by weight, per 100 parts by weight of component b) and/or, with preference and, the proportion of component e) in the molding composition of the present invention is preferably from 0.05 to 10 parts by weight, preferably from 0.2 to 5 parts by weight, with particular preference from 0.5 to 3 parts by weight, per 100 parts by weight of component b).

Component a)

In principle, it is possible to use any of the aliphatic, cycloaliphatic and aromatic isocyanates, and their modified forms and prepolymers. The polyisocyanates used can comprise one or more isocyanate groups, but it is preferable that the isocyanates should be at least difunctional. Particularly suitable isocyanates for the production of molding compositions, in particular of gels, are described by way of example in EP 1 125 975 A1. Examples of isocyanates very particularly suitable for the production of gels are toluene 2,4-diisocyanate (TDI), methylenediphenyl diisocyanate (MDI), hexamethylene diisocyanate (HMDI), isophorone diisocyanate (IPDI) and 4,4'-diisocyanatodicyclohexylmethane (H12MDI). It is particularly preferable to use prepolymeric isocyanates based on HDI and MDI with functionalities of from 2 to 4.

Component b)

It is possible to use, as component b), any of the compounds that are reactive toward isocyanate groups, or a blend of these compounds. It is preferable to use, as component b) for the production of the molding compositions of the present invention, in particular gels, the polyols described in EP 1125975 A1. It is preferable to use, as components b), polyether polyols with OH number <100 and with a functionality of from 2 to 8, particularly those with OH number <60 and with a functionality of from 3 to 6.

Component c)

It is possible to use, as component c), any of the catalysts which catalyze the reaction between isocyanate groups and groups reactive toward isocyanate.

Examples of catalysts that can be used are tertiary amines, such as triethylamine, tributylamine, N-methylmorpholine, N-ethylmorpholine, N,N,N,N-teramethylethylenediamine, 1,4-diazabicyclo[2.2.2]octane, N-methyl-N-dimethylaminoethylpiperazine, N,N-dimethyl-benzylamine, bis(N,N-diethylaminoethyl)adipate, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole, Mannich bases derived from secondary amines, e.g., dimethylamine, and from aldehydes, preferably formaldehyde, or from ketones, such as acetone, methyl ethyl ketone or cyclohexanone, and from phenols, such as phenol or nonyl phenol, or from bisphenols; other examples are sila-amines having carbon-silicon bonds as described by way of example in DE-C 1 229 290 and U.S. Pat. No. 3,620,984, preferably 2,2,4-trimethyl-2-silamorpholine or 1,3-diethylaminomethyltetramethyldisiloxane, nitrogen-containing bases, preferably tetrakylammonium hydroxides, alkali metal hydroxides, preferably sodium hydroxide, alkali metal phenolates, preferably sodium phenolate, and alkali metal alcoholates, preferably sodium methoxide (methylate), hexahydrothiazines, and organometallic compounds, in particular organic compounds of, and organic salts of, tin, zirconium, bismuth, titanium and zinc.

Other catalysts, and also details of the mode of action of the catalysts, are described in Kunststoff-Handbuch [Plastics handbook] volume VII, edited by Vieweg and Hochtlen, Carl-Hanser-Verlag Munich, 1966, e.g. on pp. 96-102. It is also possible to use mixtures of various catalysts.

An example of an amount that can be used of the catalyst is from 0.01 to 10% by weight, based on the total weight of the mixture for production of the gel.

Component c) present in the molding composition of the present invention preferably comprises tertiary amines, in particular one of the abovementioned amines, and/or organic tin salts, organic bismuth salts or organic zinc salts, in particular of carboxylic acids having from 8 to 18 carbon atoms. Component c) present in the molding composition of the present invention (for the production of gels) particularly preferably comprises bismuth trisneodecanoate.

Component d)

The pyrogenically produced oxides can preferably be produced by a flame hydrolysis route. Pyrogenically produced oxides of metals and/or of metalloids are known from Ullmanns Enzyklopädie der technischen Chemie [Ullmann's Encyclopaedia of industrial chemistry] $4^{th}$ Edition, volume 21, pp. 464 and 465 (1982). The molding compositions of the present invention can comprise physical mixtures of pyrogenically produced oxides of metals and/or of metalloids and/or can comprise pyrogenically produced mixed oxides of metals and/or of metalloids.

It is preferable to use one or more of the following pyrogenically produced oxides: silicon dioxide, aluminium oxide, mixed oxide of silicon dioxide and aluminium oxide, titanium dioxide, mixed oxide of titanium dioxide and iron oxide. Component d) present in the molding composition of the present invention preferably comprises silicon dioxide.

Particular preference is given to use, as component d), of pyrogenically produced silicon dioxides which have been surface-treated, examples being Aerosil® R 8200, Aerosil® R972, Aerosil® R974, Aerosil® R805, Aerosil® R 202 or Aerosil® R812. These oxides are described in the series of publications entitled Pigmente [Pigments] No. 27 (August 1993) from Degussa AG.

Examples of surface-treating agents that can be used for the pyrogenically produced oxides are: dimethyldichlorosilane, trimethyldichlorosilane, hexamethyldisilazane, polydimethylsiloxanes, alkylsilanes, for example, trimethoxyoctylsilane and triethoxyoctylsilane.

In particular, the pyrogenically produced hydrophilic and, respectively, hydrophobic oxides stated in Tables 1a and 1b can be used:

TABLE 1a

| | | \multicolumn{6}{c}{Hydrophilic oxides} |
|---|---|---|---|---|---|---|---|
| Test method | | AEROSIL 90 | AEROSIL 130 | AEROSIL 150 | AEROSIL 200 | AEROSIL 300 | AEROSIL 380 |
| Behaviour with respect to water | | | | hydrophilic | | | |
| Appearance | | | | free-flowing white powder | | | |
| BET[1] surface area | $m^2/g$ | 90 + 15 | 130 + 25 | 150 + 15 | 200 + 25 | 300 + 30 | 380 + 30 |
| Average size of primary particles | nm | 20 | 16 | 14 | 12 | 7 | 7 |
| Tamped density (approx. value)[2] | g/l g/l | 80 120 | 50 120 | 50 120 | 50 120 | 50 120 | 50 130 |
| compacted product (suffix "V")[11] | g/l | | | 50/75 | 50/75 | 50/75 | |
| VV product (suffix "VV")[12] | g/l | | | | 120/150 | 120/150 | |
| Loss on drying[3] (2 hours at 105° C.) on leaving supplier's works | % | <1.0 | <1.5 | <0.5[9] | <1.5 | <1.5 | <2.0 |
| Loss on ignition[4][7] (2 hours at 1000° C.) | % | <1 | <1 | <1 | <1 | <2 | <2.5 |
| pH[5] | | 3.7-4.7 | 3.7-4.7 | 3.7-4.7 | 3.7-4.7 | 3.7-4.7 | 3.7-4.7 |
| $SiO_2$[8] | % | >99.8 | >99.8 | >99.8 | >99.8 | >99.8 | >99.8 |
| $Al_2O_3$[8] | % | <0.05 | <0.05 | <0.05 | <0.05 | <0.05 | <0.05 |
| $Fe_2O_3$[8] | % | <0.003 | <0.003 | <0.003 | <0.003 | <0.003 | <0.003 |
| $TiO_2$[8] | % | <0.03 | <0.03 | <0.03 | <0.03 | <0.03 | <0.03 |
| HCl[8][10] | % | <0.025 | <0.025 | <0.025 | <0.025 | <0.025 | <0.025 |

TABLE 1a-continued

| | | | | | | |
|---|---|---|---|---|---|---|
| Hydrophilic oxides | | | | | | |
| Sieve residue[6] Mocker method, 45 mm) | % | <0.05 | <0.05 | <0.05 | <0.05 | <0.05 | <0.05 |

| Test method | | AEROSIL OX 50 | AEROSIL TT 600 | AEROSIL MOX 80 | AEROSIL MOX 170 | AEROSIL COK 84 |
|---|---|---|---|---|---|---|
| Behaviour with respect to water | | hydrophilic | | | | |
| Appearance | | free-flowing white powder | | | | |
| BET[1] surface area | m²/g | 50 + 15 | 200 + 50 | 80 + 20 | 170 + 30 | 170 + 30 |
| Average size of primary particles | nm | 40 | 40 | 30 | 15 | — |
| Tamped density (approx. value)[2] | g/l | 130 | 60 | 60 | 50 | 50 |
| compacted product (suffix "V")[11] | g/l | | | | | |
| VV product (suffix "VV")[12] | g/l | | | | | |
| Loss on drying[3] (2 hours at 105° C.) on leaving supplier's works | % | <1.5 | <2.5 | <1.5 | <1.5 | <1.5 |
| Loss on ignition[4] [7] (2 hours at 1000° C.) | % | <1 | <2.5 | <1 | <1 | <1 |
| pH[5] | | 3.8-4.8 | 3.6-4.5 | 3.6-4.5 | 3.6-4.5 | 3.6-4.3 |
| $SiO_2$[8] | % | >99.8 | >99.8 | >98.3 | >98.3 | 82-86 |
| $Al_2O_3$[8] | % | <0.08 | <0.05 | 0.3-1.3 | 0.3-1.3 | 14-18 |
| $Fe_2O_3$[8] | % | <0.01 | <0.003 | <0.01 | <0.01 | <0.1 |
| $TiO_2$[8] | % | <0.03 | <0.03 | <0.03 | <0.03 | <0.03 |
| HCl[8] [10] | % | <0.025 | <0.025 | <0.025 | <0.025 | <0.1 |
| Sieve residue[6] Mocker method, 45 mm) | % | <0.2 | <0.05 | <0.1 | <0.1 | <0.1 |

[1] based on DIN 66131
[2] based on DIN ISO 787/XI, JIS K 5101/18 (not sieved)
[3] based on DIN ISO 787/II, ASTM D 280, JIS K 5101/21
[4] based on DIN 55921, ASTM D 1280, JIS K 5101/23
[5] based on DIN ISO 787/IX, ASTM D 1208, JIS K 5101/24
[6] based on DIN ISO 787/XVIII, JIS K 5101/20
[7] based on substance dried at 105° C. for 2 hours
[8] based on substance ignited at 1000° C. for 2 hours
[9] specific packaging providing protection from moisture
[10] HCl content is a constituent of the loss on ignition
[11] V product is supplied in 20 kg bags
[12] VV product is currently supplied exclusively from the Rheinfelden works TABLE 1b Hydrophobic oxides

| Test method | | AEROSIL R 972 | AEROSIL R 974 | AEROSIL R 202 | AEROSIL R 805 | AEROSIL R 812 | AEROSIL R 812 S | AEROSIL R 104 | AEROSIL R 106 |
|---|---|---|---|---|---|---|---|---|---|
| Behaviour with respect to water | | | | | hydrophobic | | | | |
| Appearance | | | | | free-flowing white powder | | | | |
| BET[1)] surface area | m$^2$/g | 110 + 20 | 170 + 20 | 100 + 20 | 150 + 25 | 260 + 30 | 220 + 25 | 150 + 25 | 250 + 30 |
| Average size of primary particles | nm | 16 | 12 | 14 | 12 | 7 | 7 | 12 | 7 |
| Tamped density/approx. value[2)] normal product | g/l | 50 | 50 | 50 | 50 | 50 | 50 | 50 | 50 |
| compacted product (suffix "V")[12)] | g/l | 90 | 90 | | | | | | |
| Loss on drying[3)] (2 hours at 105° C.) on leaving supplier's works | % | <0.5 | <0.5 | <0.5 | <0.5 | <0.5 | <0.5 | — | — |
| Loss on ignition[4)7)] (2 hours at 1000° C.) | % | <2 | <2 | 4-6 | 5-7 | 1.0-2.5 | 1.5-3.0 | — | — |
| C content | % | 0.6-1.2 | 0.7-1.3 | 3.5-5.0 | 4.5-6.5 | 2.0-3.0 | 3.0-4.0 | 1-2 | 1.5-3.0 |
| pH[5)10)] | | 3.6-4.4 | 3.7-4.7 | 4-6 | 3.5-5.5 | 5.5-7.5 | 5.5-7.5 | >4.0 | >3.7 |
| SiO$_2$[8)] | % | >99.8 | >99.8 | >99.8 | >99.8 | >99.8 | >99.8 | >99.8 | >99.8 |
| Al$_2$O$_3$[8)] | % | <0.05 | <0.05 | <0.05 | <0.05 | <0.05 | <0.05 | <0.08 | <0.05 |
| Fe$_2$O$_3$[8)] | % | <0.01 | <0.01 | <0.01 | <0.01 | <0.01 | <0.01 | <0.01 | <0.01 |
| TiO$_2$[8)] | % | <0.03 | <0.03 | <0.03 | <0.03 | <0.03 | <0.03 | <0.03 | <0.03 |
| HCl[11)] | % | <0.05 | <0.1 | <0.025 | <0.025 | <0.025 | <0.025 | <0.002 | <0.025 |

[1)] based on DIN 66131
[2)] based on DIN ISO 787/XI, JIS K 5101/18 (not sieved)
[3)] based on DIN ISO 787/II, ASTM D 280, JIS K 5101/21
[4)] based on DIN 55921, ASTM D 1280, JIS K 5101/23
[5)] based on DIN ISO 787/IX, ASTM D 1208, JIS K 5101/24
[7)] based on substance dried at 105° C. for 2 hours
[8)] based on substance ignited at 1000° C. for 2 hours
[10)] in water:methanol = 1:1
[11)] HCl content is a constituent of the loss on ignition
[12)] V product is supplied in 15 kg bags

| Properties | AEROSIL R 8200 |
|---|---|
| Behaviour with respect to water | hydrophobic |
| BET surface area m$^2$/g | 160 + 25 |
| Tamped density g/l | about 140 |
| Loss on drying (2 h at 105° C.) % | <0.5 |
| pH (4% in water) | >5.5 |
| Carbon content % | 2.0-4.0 |
| SiO$_2$ % | >99.8 |
| Fe$_2$O$_3$ % | <0.01 |
| TiO$_2$ % | <0.03 |
| HCl % | <0.025 |

It is preferable that components d) are not zeolites.

Component e)

The compounds of formula (I) can by way of example be obtained via a hydrosilylation reaction (reactions of the Si—H-functional siloxanes with allyl polyethers) as described by way of example in EP 1 520 870 A. In particular, the hydrosilylation reaction can be carried out as described in example 1 of that document.

The Si—H-functional siloxane to be used for the production of the compounds of formula (I) can by way of example be produced via equilibration as described in the document EP 1439200 A, in particular in Example 1 of the same document. For the production of siloxanes having terminal hydrogen, it is necessary to use, as raw material, a polymethylhydrosiloxane with terminal hydrogen functionality. The nature and amount of the raw materials is to be selected in such a way as to give the respective desired siloxane structure.

The allyl polyethers can by way of example be produced by a method based on that described in the document DE 19940797, in particular in accordance with the method described in Example 1 of the said document.

The molding compositions of the present invention can comprise water, and in particular the molding compositions of the present invention can comprise water when bismuth compounds or bismuth salts are used as catalyst component c). However, preferred molding compositions of the present invention comprise less than 2% by weight of water, based on the molding composition, preferably less than 0.2% by weight of water, and in particular no water. The water does not lead to any foaming of the reaction mixture.

It is preferable that the molding compositions of the present invention comprise no components that represent a chemical blowing agent. The expression chemical blowing agents means blowing agents which, under the reaction conditions, eliminate or produce a gas, with the exception of water. In particular, the molding composition of the present invention does not comprise the chemical blowing agent formic acid. In accordance with the present explanation, if any water is present it does not represent a chemical blowing agent.

For the purposes of the present invention, the expression physical blowing agents means compounds which are present in gaseous form at atmospheric pressure and at a temperature below 50° C., preferably below 25° C., and which do not react chemically with any of the other compounds present in the molding composition of the present invention.

Preferred physical blowing agents are those selected from the group consisting of carbon dioxide, acetone, hydrocarbons, e.g., n-, iso- or cyclopentane, cyclohexane and halogenated hydrocarbons, e.g., methylene chloride, tetrafluoroethane, pentafluoropropane, heptafluoropropane, pentafluorobutane, hexafluorobutane and dichloromonofluoroethane.

As mentioned above, the molding compositions of the present invention can comprise physical blowing agents, but in the low concentrations stated above. The density of the resultant moldings is preferably greater than or equal to 500 kilograms per cubic meter, preferably greater than or equal to 700 kilograms per cubic meter, particularly preferably greater than or equal to 900 kilograms per cubic meter. It is preferable that the molding compositions of the present invention comprise no physical blowing agent.

The molding compositions of the present invention can further comprise constituents besides components a) to e) mentioned. The proportion of the further constituents, based on the total composition, can be up to 75% by weight, based on the total composition. It is preferable that the molding compositions of the present invention comprise one or more constituents selected from flame retardant, antioxidants, UV stabilizer, inorganic and/or organic fillers not covered by the definition of component d), colorants, water-binding agents, surfactant substances not covered by the definition of component e), plant-protection agent, extender and/or plasticizer.

Flame retardants used are preferably those that are liquid and/or are soluble in the molding composition or in one of the other components used. It is preferable to use commercially available phosphorus-containing flame retardants, such as diphenyl cresyl phosphate, tricresyl phosphate, tris(2-chloroethyl)phosphate, tris(2-chloropropyl)phosphate, tris(2,3-dibromopropyl)phosphate, tris(1,3-dichloropropyl)phosphate, tetrakis(2-chloroethyl)ethylenediphosphate, trisbutoxyethyl phosphate, dimethyl methanephosphonate, diethyl ethanephosphonate, diethyl diethanolaminomethylphosphonate. Equally suitable compounds are halogen- and/or phosphorus-containing, flame-retardant polyols and/or melamine, and also expandable graphite. The amount preferably used of the flame retardants is at most 35% by weight, preferably at most 20% by weight, based on the polyol component.

Inorganic fillers comprised in the molding composition of the present invention are preferably baryte, chalk, gypsum, kieserite, soda, kaolin, carbon black, metal powder, e.g., iron powder or copper powder and/or glass microbeads.

Examples of organic fillers that can be present in the molding composition of the present invention are powders based on polystyrene, polyvinyl chloride, urea-formaldehyde compositions and/or polyhydrazodicarbonamides (e.g., derived from hydrazine and tolylene diisocyanate). It is possible by way of example that urea-formaldehyde resins or polyhydrazodicarbonamides have been produced directly in a polyol to be used for the molding composition of the present invention. It is also possible to add hollow microbeads of organic origin.

Inorganic and/or organic fillers can also be present in the form of short fibres. Examples of short fibres that can be used are glass fibres and/or fibres of organic origin, for example polyester fibres or polyamide fibres. The length of the short fibres is preferably from 0.01 to 1 cm.

Examples of colorants that can be present in the molding compositions of the present invention are organically and/or inorganically based dyes and/or color pigments that are known per se for coloring polyurethane, for example iron oxide pigments and/or chromium oxide pigments and phthalocyanine-based and/or monoazo-based pigments, but colorants used comprise no pyrogenic oxide, in particular no pyrogenic oxide selected from silicon dioxide, aluminium oxide, mixed oxide of silicon dioxide and aluminium oxide, titanium dioxide or mixed oxide of titanium dioxide and iron oxide.

Water-binding agents that can preferably be present are zeolites. Suitable synthetic zeolites are available commercially by way of example as Baylith®.

Extenders that can be present in the molding composition of the present invention are preferably liquid, practically inert substances with boiling point above 150° C. (at atmospheric pressure). Examples that may be mentioned are: alkyl-, alkoxy- and/or halogen-substituted aromatic compounds, such as dodecylbenzene, m-dipropoxybenzene and/or o-dichlorobenzene, halogenated aliphatic compounds such as chlorinated paraffins, organic carbonates such as propylene carbonate, esters of carboxylic acids, for example, dioctyl phthalate, and also esters of dodecylsulfonic acid; other examples are organic phosphorus compounds such as tricresyl phosphate.

Examples of plasticizers that can be used in the molding composition of the present invention are esters of phosphoric acid or of polybasic, preferably dibasic carboxylic acids with monohydric alcohols, e.g., esters of succinic acid, isophthalic acid, trimellitic acid, phthalic anhydride, tetra- and/or hexahydrophthalic anhydride, endomethylenetetrahydrophthalic anhydride, glutaric anhydride, maleic anhydride, fumaric acid and/or dimeric and/or trimeric fatty acids, such as oleic acid, optionally in a mixture with monomeric fatty acids, formed with branched and/or aliphatic alcohols having from 1 to 20 carbon atoms, e.g., methanol, ethanol, propanol, isopropanol, n-butanol, sec-butanol, tert-butanol, the various isomers of pentyl alcohol, of hexyl alcohol, of octyl alcohol (for example, 2-ethylhexanol), of nonyl alcohol, of decyl alcohol, of decyl alcohol, of lauryl alcohol, of myristyl alcohol, of cetyl alcohol, stearyl alcohol and/or of fatty and wax alcohols that occur naturally or that are obtainable via hydrogenation of naturally occurring carboxylic acids, or of cycloaliphatic and/or aromatic hydroxyl compounds, such as cyclohexanol and its homologues, phenol, cresol, thymol, carvacrol, benzyl alcohol and/or phenylethanol. It is, of course, also possible to use mixed esters of the abovementioned alcohols and carboxylic acids.

The molding composition of the present invention can also preferably comprise phosphoric esters derived from halogenated alcohols, for example, trichloroethyl phosphate. These have the advantage that a flame-retardant effect can be achieved at the same time as the plasticizer effect.

The plasticizers can also involve "polymeric plasticizers", for example polyesters of adipic, sebacic and/or phthalic acid.

Alkylsulphonic esters of phenol can also be used as plasticizers, examples are phenyl paraffinsulphonates.

The molding compositions of the present invention can be used for the production of moldings. In particular, the molding compositions of the present invention can be used in the process described below.

The process for the production of moldings based on reaction products of one or more polyisocyanates and one or more polyols is characterized in that a molding composition of the present invention is converted to a molding by a shaping process, and the reaction for the production of the reaction products at least continues after the shaping process.

In the process of the present invention, the molding composition is preferably produced via mixing of the components prior to or during the shaping process. The mixing is preferably achieved by means of a mixing nozzle. The components can be introduced individually, or else in various premixes, to the mixing nozzle. It is preferable that mixtures comprising components b), c) and d) are introduced into the mixing nozzle while each of components a) and e) is introduced separately.

The reaction to give the reaction products begins when components a) to c) are brought into contact. It is therefore preferable that components a) to c) are brought into contact only shortly before or during the shaping process, in such a way that the reaction has not concluded before the molding is obtained. The conduct of the process is preferably such that when the processing to give the molding is concluded the conversion achieved in the reaction is at most 50% of the theoretically possible conversion. It is preferable that the components are mixed in a mixing head or static mixer directly before discharge into a mold or onto a surface. In accordance with the process of the present invention, it is possible by way of example to produce an appropriately molded linear product by way of the geometric shape of the discharge nozzle. The residence time in the mixing head or mixer is preferably less than 20 seconds, with preference less than 10 seconds. The hardening, i.e., the polyurethane reaction, preferably takes place in from 30 sec to 15 min; this can be adjusted via the selection and amount of the catalyst.

It can be advantageous to control the temperature of the reaction mixture. The temperature at which the reactions are then carried out is preferably below 90° C., more preferably below 50° C. and in particular preferably below 25° C.

In the process of the present invention, it is preferable to use molding compositions which comprise no blowing agents.

The moldings of the present invention can be obtained by means of the process of the present invention and also through reaction of a molded molding composition of the present invention. The molding of the present invention is preferably a gel.

The gels according to the invention have the property of deforming on exposure to a force and, after removal of the deforming force, returning almost completely to their initial state. An effect of this property is that elements which comprise the gels according to the invention can deform under pressure, can conform to surfaces, and can compensate for unevenness. The property is retained even after repeated application of load to, and removal of load from, the gel.

Components which comprise gels according to the invention can be used in many ways, for example as sealing elements. Direct application as sealing element and/or extensible element with unconstrained geometry is possible according to the invention. In particular, it is possible to apply the molding composition to surfaces without any other shaping aids and thus to apply a sealing element, such as a sealing bead, with completely unconstrained geometry. Coating of surfaces with any desired gradients and with vertical planes is likewise possible. By varying component e) it is possible to adjust to a defined thixotropy/viscosity, and this is particularly advantageous for the smooth transition between the start and end of an annular sealing element. To this end, the variation of component e) can take place during metering, in particular in the region of the transition between the beginning and end of the metering of the sealing element.

The cross-sectional geometry of the gel can be modified appropriately by using an appropriately shaped diaphragm, i.e., the extruded gel can have, as desired, a round or polygonal cross-sectional geometry or any other type of cross-sectional geometry. Examples of applications here are seals having any desired shapes for housings, in particular seals which are not subject to any spatial restriction and which are not flat, i.e., for which a non-flowable molding composition is necessary.

Another possible application uses gel cushions as vibration-damping element, particularly for solid-borne-sound-deadening. The molding composition of the present invention can be applied by spraying, casting, immersion, spreading or other types of process. The adjustable and distinct thixotropy of the molding composition of the present invention permits production of geometries and layer thicknesses which would not be obtainable through use of a low-viscosity (or non-thixotropic) molding composition.

In particular, the possible variation of component e) and the resultant variation of viscosity (or thixotropy, i.e., shear-rate-dependent viscosity) is very advantageous for spraying of the molding composition of the present invention. Equally, it is possible to manufacture a sprayed skin with uniform layer thickness in tooling of any desired geometry. By way of example, a gel-type sprayed skin can be used for "soft-touch" elements, for example decorative foils for instrument panels.

The gel according to the invention is adhesive and can therefore be used as adhesion medium, for example as assembly aid for sealing elements.

The molding of the present invention is preferably a sealing element, an assembly aid, an adhesion medium, a soft-touch element, a gel cushion or a vibration-damping element, or is preferably used as sealing element, as assembly aid, as adhesion medium, as soft-touch element, as gel cushion or as vibration-damping element.

A typical polyurethane gel formulation for the purposes of this invention would have the following constitution:

Constitution:

| Component | proportion by weight |
|---|---|
| Polyol | 100 |
| Pyrogenic oxide | from 1 to 30 |
| Catalyst | from 0.05 to 1.5 |
| Siloxane (formula (I)) | from 0.25 to 7.5 |
| Flame retardant | from 0 to 50 |
| Isocyanate index: | from 13 to 80 |

The present invention is described by way of example in the examples listed below, but without any intention that the invention, the scope of application of which is apparent from the entire description and from the claims, be restricted to the embodiments specified in the examples.

EXAMPLES

Example 1

Production Processes for Mixtures of Components a), b), c), d) and e)

Mixtures composed of
polyisocyanate (only sometimes present)
polyol
catalyst
pyrogenically produced oxide of a metal or of a metalloid
organomodified siloxane of the formula (I)
were produced for measurement of thixotropic properties by technical methods.

Addition of polyisocyanates—component a)—causes hardening of the mixture to begin, and this can make it more difficult to measure rheological properties. Just a few measurements with an isocyanate were therefore carried out, in order to demonstrate retention of the thixotropic properties.

It was also possible to demonstrate thixotropy by using appropriate experiments in the Examples 3 by casting, onto a smooth surface, material that does not lose its shape as a result of flow.

Description of Components a) to e) Used

The following polyisocyanate was used:

No. 1: difunctional HDI prepolymer with 12.5% NCO content, with viscosity 4000 mPa*s The following polyols were used:

No. 1: trifunctional polyalkylene glycol composed of EO and PO with 82 mol % content of PO, with OH number 35 mg KOH/g and with viscosity 860 mPa*s No. 2: trifunctional Polyalkylene glycol composed of PO with OH number 56 mg KOH/g and with viscosity 660 mPa*s, obtainable as Arcol polyol 1104 from Bayer MaterialScience No. 3: trifunctional polyalkylene glycol composed of EO and PO with 85 mol % content of PO, OH number=32 mg KOH/g and with viscosity 1390 mPa*s obtainable as Hyperlite 1629 from Bayer MaterialScience No. 4: trifunctional polyalkylene glycol composed of PO with OH number 56 mg KOH/g and with viscosity 550 mPa*s, obtainable as Voranol CP 3322 from Dow The following catalyst was used:
No. 1: bismuth tris(neodecanoate)—COSCAT 83® from Erbsloh The following pyrogenic oxides were used:
No. 1: Aerosil® R 8200 from Evonik Industries AG
No. 2: Aerosil R 805 from Evonik Industries AG The following siloxanes were used:
Organomodified siloxanes of the formula (I)

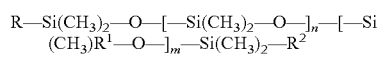

having moieties $R^1$ of the formula (II)

As described in Example 1 of document EP 1439200 A1, the Si—H-functional siloxanes to be used were produced from the corresponding siloxane raw materials via equilibration. (For the production of siloxanes with terminal modification, a polymethylhydrosiloxane with terminal hydrogen functionality must accordingly be used as raw material.) The nature and amount of the raw materials was selected in such a way as to give the respective desired siloxane structure.

The allyl polyethers were produced by analogy with the method described in Example 1 of DE 19940797 A1, in this case using allyl alcohol as starter and, as appropriate, ethylene oxide and propylene oxide or styrene oxide.

The hydrosilylation reactions (reactions of the Si—H-functional siloxanes with the allyl polyethers) were carried out in accordance with Example 1 in document EP 1520870 A1.

Table 1 collates the structures used for the moieties R'. Table 2 describes the siloxanes according to the invention. The terminology and indices in formula (I) were used. All % data in Table 1 and Table 2 are in mol %. The abbreviation Me in Tables 1 and 2 means a methyl group.

TABLE 1

Description of side chains $R^1$:

| Name | R' | R'' | x | y | z |
|---|---|---|---|---|---|
| A | 35 mol % of Me; 65 mol % of H | H | 3 | 23 | 1 |
| B | 20 mol % of Me; 80 mol % of H | H | 3 | 15 | 1 |
| C | 100 mol % of H | H | 3 | 12 | 1 |
| D | 20 mol % of Me; 80 mol % of H | H | 3 | 13 | 1 |
| E | 100 mol % of H | H | 3 | 8 | 1 |
| F | — | H | 6 | 0 | 1 |
| G | 100 mol % of H | H | 3 | 1 | 1 |
| H | 100 mol % of H | Me | 3 | 8 | 1 |

TABLE 2

Description of siloxanes Nos. 1 to 17:

| Siloxane | R | $R^2$ | $R^1$ | n | m |
|---|---|---|---|---|---|
| 1 | Me | Me | 100 mol % of E | 35 | 3 |
| 2 | Me | Me | 100 mol % of C | 28 | 10 |
| 3 | $R^1$ | $R^1$ | 100 mol % of A | 40 | 3 |
| 4 | Me | Me | 100 mol % of C | 20 | 2 |
| 5 | Me | Me | 100 mol % of B | 50 | 7 |
| 6 | Me | Me | 100 mol % of E | 60 | 7 |
| 7 | $R^1$ | $R^1$ | 100 mol % of C | 17 | 1 |
| 8 | $R^1$ | $R^1$ | 100 mol % of E | 75 | 1 |
| 9 | Me | Me | 100 mol % of E | 75 | 5 |
| 10 | Me | Me | 100 mol % of D | 35 | 3 |
| 11 | $R^1$ | $R^1$ | 100 mol % of F | 9 | 0 |
| 12 | $R^1$ | $R^1$ | 100 mol % of E | 35 | 3 |
| 13 | Me | Me | 100 mol % of E | 65 | 13 |
| 14 | Me | Me | 100 mol % of E | 40 | 10 |
| 15 | Me | Me | 100 mol % of G | 40 | 3 |
| 16 | R1 | R1 | 100 mol % of H | 35 | 3 |
| 17 | Me | Me | 100 mol % of H | 60 | 7 |

Various mixtures were produced via mixing of the appropriate starting materials. The Aerosil grades were stirred into the appropriate polyols with the aid of a disperser disc at rotation rates of 500 to 2000 rpm. The other components (catalyst, siloxanes and optionally isocyanate) were then stirred into the mixture at lower rotation rates of from 50 to 500.

The amounts used of the starting materials can be found in Table 3. All of the mixtures specified comprised 0.2 part of bismuth trisneodecanoate, based on 100 parts of polyol.

TABLE 3

Constitution of the mixtures in proportions by mass

| Ex. No. | Polyol No. | Polyol Parts | Pyrogenic oxide No. | Pyrogenic oxide Parts | Siloxane No. | Siloxane Parts |
|---|---|---|---|---|---|---|
| 1. comp. 1 | 1 | 100 | 1 | 15 | — | |
| 1.1 | 1 | 100 | 1 | 15 | 6 | 3 |
| 1.2 | 1 | 100 | 1 | 15 | 6 | 0.5 |
| 1.3 | 1 | 100 | 1 | 15 | 12 | 0.5 |
| 1.4 | 1 | 100 | 1 | 15 | 6 | 1 |
| 1. comp. 2 | 1 | 100 | 2 | 10 | — | |
| 1.5 | 1 | 100 | 2 | 10 | 6 | 1 |
| 1.6 | 1 | 100 | 2 | 10 | 8 | 1 |
| 1.7 | 1 | 100 | 2 | 10 | 9 | 1 |
| 1.8 | 1 | 100 | 2 | 10 | 12 | 1 |
| 1. comp. 3 | 4 | 100 | 2 | 10 | | |
| 1.9 | 4 | 100 | 2 | 10 | 6 | 1 |
| 1.10 | 4 | 100 | 2 | 10 | 4 | 1 |
| 1.11 | 4 | 100 | 2 | 10 | 5 | 1 |
| 1.12 | 4 | 100 | 2 | 10 | 3 | 1 |
| 1. comp. 4 | 3 | 100 | 2 | 10 | | |
| 1.13 | 3 | 100 | 2 | 10 | 1 | 1 |
| 1.14 | 3 | 100 | 2 | 10 | 2 | 1 |
| 1.15 | 3 | 100 | 2 | 10 | 7 | 1 |
| 1.16 | 3 | 100 | 2 | 10 | 6 | 1 |
| 1. comp. 5 | 2 | 100 | 1 | 15 | | |
| 1.17 | 2 | 100 | 1 | 15 | 6 | 3 |
| 1.18 | 2 | 100 | 1 | 15 | 6 | 2 |
| 1.19 | 2 | 100 | 1 | 15 | 6 | 1 |
| 1.20 | 2 | 100 | 1 | 15 | 5 | 1 |
| 1.21 | 2 | 100 | 1 | 15 | 10 | 1 |
| 1.22 | 2 | 100 | 1 | 15 | 4 | 1 |
| 1.23 | 2 | 100 | 1 | 15 | 3 | 1 |
| 1.24 | 2 | 100 | 1 | 15 | 11 | 1 |
| 1.25 | 2 | 100 | 1 | 15 | 13 | 1 |
| 1.26 | 2 | 100 | 1 | 15 | 14 | 1 |
| 1.27 | 2 | 100 | 1 | 15 | 15 | 1 |
| 1.28 | 2 | 100 | 1 | 15 | 16 | 1 |
| 1.29 | 2 | 100 | 1 | 15 | 17 | 1 |
| 1. comp. 6*) | 1 | 100 | 1 | 15 | — | |
| 1.30*) | 1 | 100 | 1 | 15 | 6 | 2 |
| 1.31*) | 1 | 100 | 1 | 15 | 6 | 3 |

*)12 parts of isocyanate No. 1 were also present here

Example 2

Determination of the Thixotropic Properties of the Mixtures

The measurements were carried out by using an Anton Paar MCR 301 rheometer with plate-on-plate (40 mm) geometry at a temperature of 25° C. The following were determined for the mixtures produced as in the example: storage modulus, loss modulus, yield point, and yield point recovery times. The samples were tested in oscillation at from 0.1 to 200 Pa (20 points, 1 Hz). The storage modulus and loss modulus were determined from the plateau values of the linear viscoelastic (LVE) region. The yield point is the shear stress at which the storage modulus deviates from ideal viscoelastic behaviour.

Recovery after shear was determined by testing the sample for 100 seconds (20×5 seconds) at 1 Pa (1 Hz). The shear stress was then increased to 500 Pa (1 Hz) for 100 seconds (20×5) before again testing at 1 Pa (1 Hz). The recovery time is determined from the time required for the storage modulus to be greater than the loss modulus. Table 4 collates the results of the tests of Example 2.

TABLE 4

Rhelogical properties of mixtures of Example 1

| Mixture | Storage modulus/ Pa | Loss modulus/Pa | Yield point/ Pa | Recovery time/s |
|---|---|---|---|---|
| 1. comp. 1 | 0.1 | 6.1 | — | — |
| 1.1 | 9290 | 4460 | 12.2 | 0 |
| 1.2 | 1030 | 445 | 5.5 | 15 |
| 1.3 | 383 | 209 | 2.5 | 40 |
| 1.4 | 4370 | 1610 | 12.2 | 0 |
| 1. comp. 2 | 52 | 72.8 | — | — |
| 1.5 | 1630 | 718 | 1.7 | 0 |
| 1.6 | 675 | 311 | 2.5 | 0 |
| 1.7 | 1880 | 584 | 1.7 | 0 |
| 1.8 | 3400 | 927 | 3.7 | 0 |
| 1. comp. 3 | 2930 | 733 | 2.5 | 0 |
| 1.9 | 8820 | 1500 | 18.1 | 0 |
| 1.10 | 7290 | 993 | 8.1 | 0 |
| 1.11 | 7900 | 1370 | 3.7 | 5 |
| 1.12 | 11800 | 2120 | 12.2 | 0 |
| 1. comp. 4 | 46.4 | 65.4 | | |
| 1.13 | 2080 | 600 | 1.7 | 0 |
| 1.14 | 1410 | 500 | 1.7 | 0 |
| 1.15 | 303 | 212 | 2.5 | 5 |
| 1.16 | 3860 | 820 | 8.2 | 0 |
| 1. comp. 5 | 22.7 | 36 | — | — |
| 1.17 | 14700 | 3110 | 15.7 | 0 |
| 1.18 | 18700 | 4020 | 11.5 | 0 |
| 1.19 | 15600 | 3210 | 15.7 | 0 |
| 1.20 | 2450 | 965 | 6.1 | 5 |
| 1.21 | 377 | 204 | 4.5 | 15 |
| 1.22 | 5160 | 1590 | 11.5 | 0 |
| 1.23 | 396 | 247 | 4.5 | 20 |
| 1.24 | 685 | 316 | 2.5 | 0 |
| 1.25 | 3550 | 1042 | 4.5 | 0 |
| 1.26 | 3120 | 867 | 3.7 | 0 |
| 1.27 | 715 | 345 | 2.5 | 0 |
| 1.28 | 1340 | 626 | 4.5 | 0 |
| 1.29 | 4200 | 190 | 6.1 | 0 |
| 1. comp. 6 | 3.7 | 16.7 | | |
| 1.30 | 1790 | 826 | 5.7 | 0 |
| 1.31 | 4040 | 1450 | 8.7 | 0 |

The tests confirm that addition of the siloxanes render the mixtures thixotropic or, as in Examples 1.comp.3, 1.9, 1.10, 1.11 and 1.12, rendered a composition more thixotropic. It is therefore possible to avoid any relatively high level of Aerosil fill and nevertheless to raise the yield point.

In the other examples, thixotropy was achieved only by addition of the siloxanes.

Example 3

Production of PU Gels

Production of the Combination of Components b), c) and d) (Polyol Mixture):

Component b) was used as initial charge. Component c) was incorporated homogeneously by mixing with a propeller stirrer at a rotation rate of 500 rpm. Component d) was then dispersed by means of a disperser disc at a rotation rate of 3000 rpm for 5 minutes. The resultant polyol mixture was devolatilized for 2 hours at subatmospheric pressure (0.2 bar absolute).

Production of the Combination of Polyol Mixture and Components a) and e) (Molding Composition):

A low-pressure three-component metering system was used to convey and mix the polyol mixture, component a) and component e). Homogenization of the individual components was achieved by using a 13-12-SR-POM static-dynamic mixing tube, mixer rotation rate=4000 rpm, mass flow rate about 600 g/min. The metering of component e) into the system could be switched on or off as desired.

For the experiments Example 3.1 and Example 3.2 specified below, the compositions of Example No. 1.31 and 1.comp.6 from Table 3 were selected. For comparison, in each case 10 mL of the molding compositions were spot-applied to a smooth substrate. The diameters of the applied spots of molding compositions were determined directly after application and 30 seconds after application. The effect of component e) on the elongation at break and tensile strength property of the material was also tested on compositions of Examples Nos. 1.31 and 1.comp.6 (ISO 53504—S2 test specimen, thickness of material 3 mm).

Example 3.1 (not According to the Invention)

Application of a molding composition corresponding to the composition of Example 1.comp.6 gives a spot of molding composition of diameter 6 cm, and after 30 seconds 9 cm, i.e. the molding composition flows. The elongation at break determined was 1251%, and tensile strength was 1.68 MPa.

Example 3.2 (According to the Invention)

Application of a molding composition corresponding to the composition of Example 1.31 gives a spot of molding composition of diameter 4 cm, and after 30 seconds 4 cm, i.e. the molding composition does not flow. The elongation at break determined was 1198%, and tensile strength was 1.52 MPa.

Addition of component e) (Example 3.2) produces a yield point (Table 4). In a commercial application, the molding composition can therefore be applied directly in the form of molding, since it does not lose its shape of a result of flow. This means in practice that the molding composition of the present invention can be applied directly in the form of molding whereas molding compositions not according to the invention lose their shape immediately after application.

Addition of component e) did not significantly affect the mechanical properties of the gels. The changes amount to <10%, based on the initial values of the properties, i.e., the improvement described in EP 1125975 A1 in the properties of the gel is approximately retained.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

What is claimed is:

1. A molding composition comprising:
   a) one or more polyisocyanates,
   b) one or more polyols,
   c) one or more catalysts catalyzing a reaction between said one or more polyisocyanates and said one or more polyols,
   d) one or more pyrogenically produced oxides of a metal or of a metalloid, wherein the proportion of component d) in the molding composition is from 1 to 30 parts by weight per 100 parts by weight of component b), and
   e) at least one or more siloxanes of formula (I)

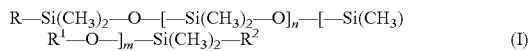   (I)

where
      R, $R^1$ and $R^2$ are identical or different,
      R and/or $R^2$ are methyl or $R^1$,
      $R^1$, is identical or different, and is selected from the group of
         —$(CH_2)$—R''',
         —$(CH_2)_x$—$(O)_z$—R'',
         —$CH_2$—$CH_2$—$CH_2$—O—$CH_2$—CH(OH)—$CH_2OH$, and
         —$(CH_2)_x$—$(O)_z$—$(CH_2$—CHR'—$O)_y$—R'',
      R', is identical or different, and is —H, —$CH_3$, —$CH_2CH_3$, or phenyl moiety,
      R'', is identical or different, and is —H, —(CO)—R''', —(CO)—NH—R''' or -alkyl,
      R''', is identical or different, and is $C_1$ to $C_{40}$-alkyl, -aryl or -alkylaryl;
      n+m+2=from 10 to 150,
      m=from 0 to 20,
      x=from 2 to 15,
      y=from 1 to 40,
      z=0 or 1,
      where the units ($CH_2$—CHR'—O) can be identical or different, and
      with the proviso that for m=0 at least one moiety R or $R^2$ is identical with $R^1$,
      and with the further proviso that if z=0, then x and y=0 and R'' has at least 2 carbon atoms,
      with the even further proviso that the molding composition comprises less than 2% by weight, based on the entire constitution of the molding composition, of a physical blowing agent.

2. The molding composition according to claim 1, wherein each $R^1$ is —$(CH_2)_x$—$(O)_z$—$(CH_2$—CHR'—$O)_y$—R''.

3. The molding composition according to claim 1, wherein the at least one or more siloxane compounds of formula (I) are those in which a numeric-average molar proportion of alkylene oxide units where R'=H, based on all of the alkylene oxide units in the moieties $R^1$, is at least 80%.

4. The molding composition according to claim 1, wherein the at least one or more siloxane compounds of formula (I) are those in which at least 80% of the moieties R'' are hydrogen.

5. The molding composition according to claim 1, wherein the at least one or more siloxane compounds of formula (I) are those in which a number of Si atoms/number of moieties $R^1$ (in each case in numeric average per molecule) is from more than 5 to less than or equal to 16.

6. The molding composition according to claim 1, wherein said one or more catalysts include bismuth trisneodecanoate.

7. The molding composition according to claim 1, wherein the proportion of component e) in the molding composition is from 0.05 to 5 parts by weight per 100 parts by weight of component b).

8. A process for the production of moldings comprising: converting a molding composition to a molding by a shaping process, wherein said molding composition comprises a) one or more polyisocyanates, b) one or more polyols, c) one of more catalysts catalyzing a reaction between said one or more polyisocyanates and said one or more polyols, d) one or more pyrogenically produced oxides of a metal or of a metalloid, and e) at least one or more siloxanes of formula

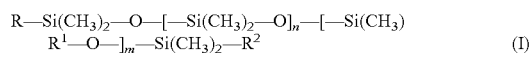   (I)

where
   R, $R^1$ and $R^2$ are identical or different,
   R and/or $R^2$ are methyl or $R^1$,
   $R^1$, is identical or different, and is selected from the group of
      —$(CH_2)$—R''',
      —$(CH_2)_x$—$(O)_z$—R'',
      —$CH_2$—$CH_2$—$CH_2$—O—$CH_2$—CH(OH)—$CH_2OH$, and
      —$(CH_2)_x$—$(O)_z$—$(CH_2$—CHR'—$O)_y$—R'',
   R', is identical or different, and is —H, —$CH_3$, —$CH_2CH_3$, or phenyl moiety,
   R'', is identical or different, and is —H, —(CO)—R''', —(CO)—NH—R''' or -alkyl,
   R''', is identical or different, and is $C_1$ to $C_{40}$-alkyl, -aryl or -alkylaryl;
   n+m+2=from 10 to 150,
   m=from 0 to 20,
   n=from 2 to 15,
   y=from 1 to 40,
   z=0 or 1,
   where the units ($CH_2$—CHR'—O) can be identical or different, and
   with the proviso that for m=0 at least one moiety R or $R^2$ is identical with $R^1$,
   and with the further proviso that if z=0, then x and y=0 and R'' has at least 2 carbon atoms,
   with the even further proviso that the molding composition comprises no blowing agent.

9. The process according to claim 8, wherein the molding composition is produced via mixing of components a)-e) prior to or during the shaping process.

10. A molding obtained via a process according to claim 8, where the molding is a gel.

* * * * *